United States Patent [19]
Kiwalle

[11] 3,718,334
[45] Feb. 27, 1973

[54] HYDROSTATIC BEARING SEAL ASSEMBLY

[75] Inventor: Jozef Kiwalle, Peoria, Ill.

[73] Assignee: Production Technology Inc.

[22] Filed: March 18, 1971

[21] Appl. No.: 125,556

Related U.S. Application Data

[63] Continuation-in-part of Ser. No. 821,041, May 1, 1969, abandoned.

[52] U.S. Cl. ..........................277/27, 277/74, 277/91
[51] Int. Cl. ..............................................F16j 15/16
[58] Field of Search..................277/27, 74, 83, 91, 81

[56] References Cited

UNITED STATES PATENTS

| | | | |
|---|---|---|---|
| 2,819,101 | 1/1958 | Luenberger | 277/83 |
| 2,984,507 | 5/1961 | Welch | 277/27 |
| 3,085,808 | 4/1963 | Williams | 277/3 |
| 3,462,159 | 8/1969 | Baumann et al | 277/27 |

FOREIGN PATENTS OR APPLICATIONS

| | | | |
|---|---|---|---|
| 1,202,432 | 7/1959 | France | 277/83 |

*Primary Examiner*—Samuel B. Rothberg
*Attorney*—Fryer, Tjensvold, Feix, Phillips & Lempio

[57] ABSTRACT

A rotary seal assembly suitable for high pressure and high speed operation in a hydrostatic environment, including an axially fixed member defining an annular seal face, a relatively rotatable floating seal ring capable of being urged toward the fixed member and having a seal face opposite the seal face on the fixed member with mechanical bearings being employed between the seal ring and fixed member to maintain desired spacing between their seal faces. One embodiment includes a pair of such seal faces arranged on a seal ring and maintained in spaced apart relation from fixed seal faces by mechanical bearings.

10 Claims, 5 Drawing Figures

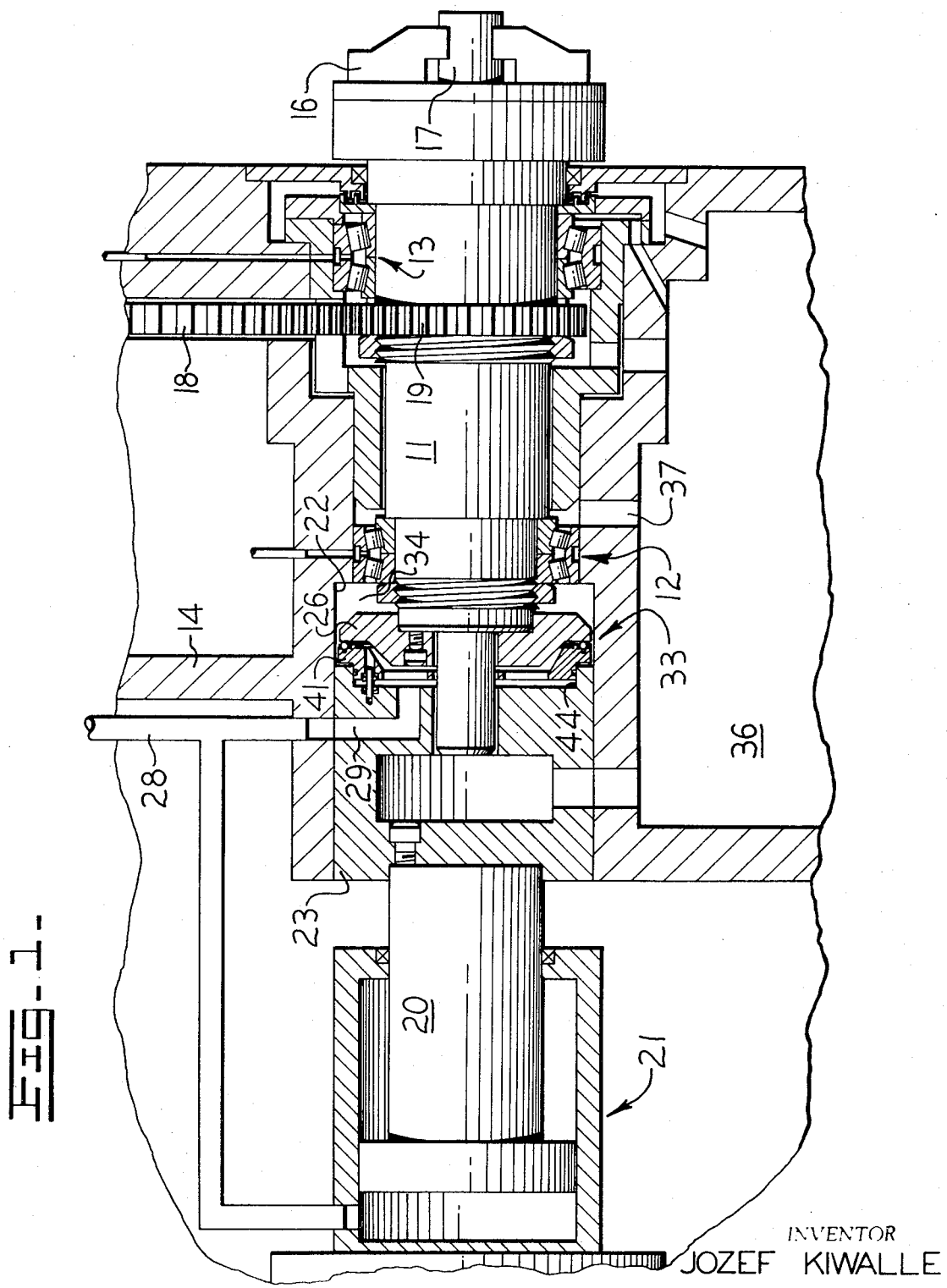

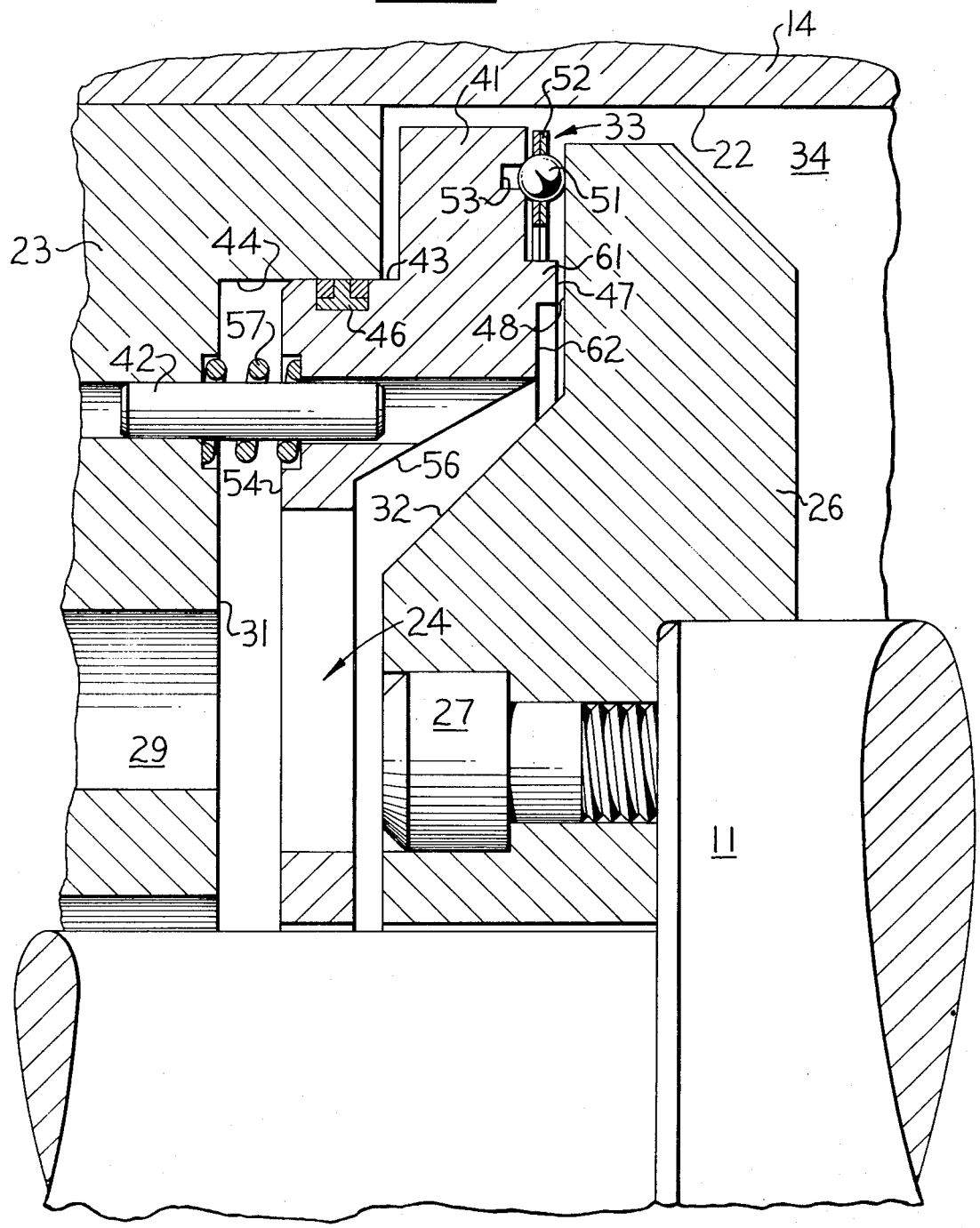

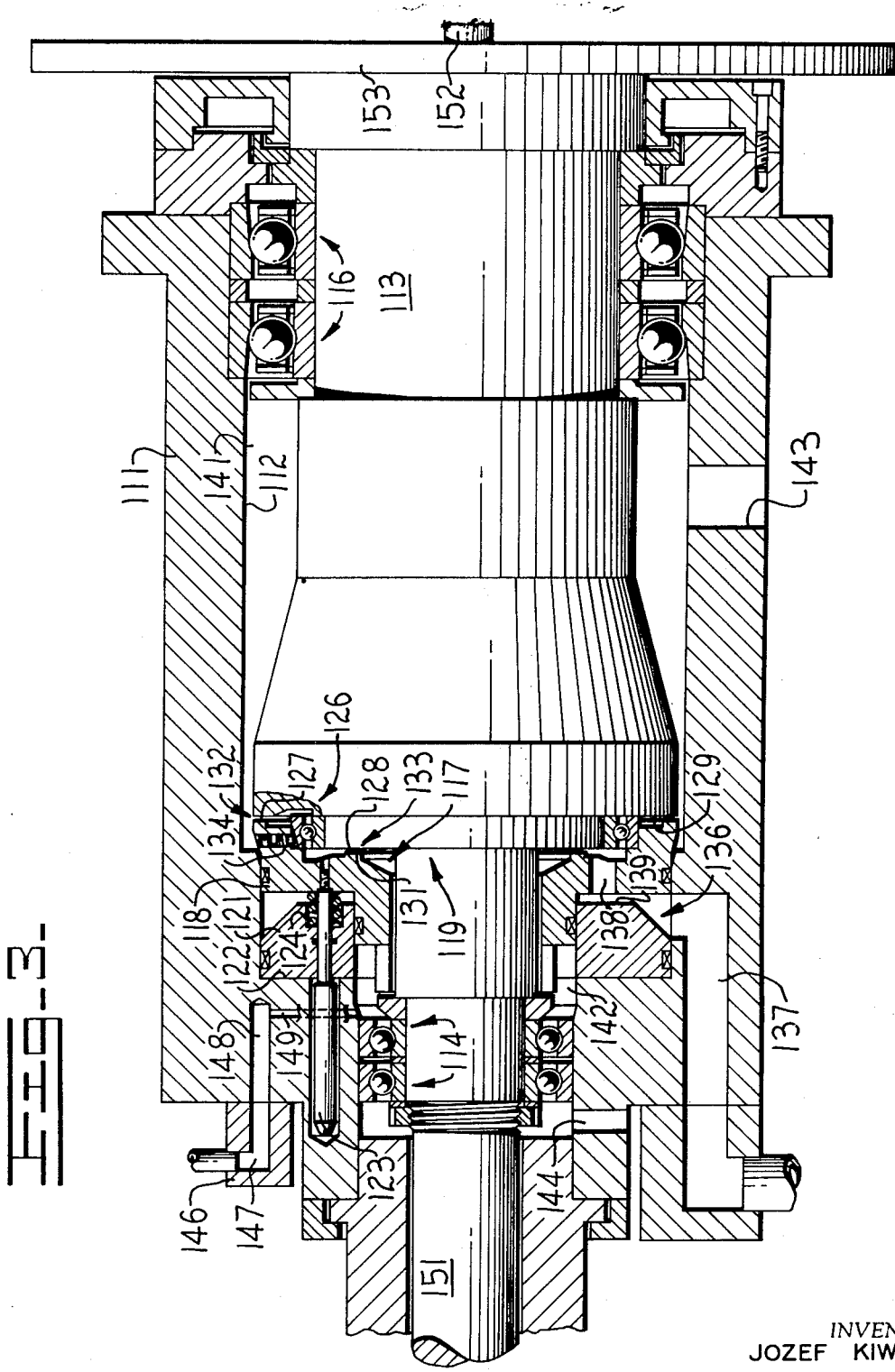

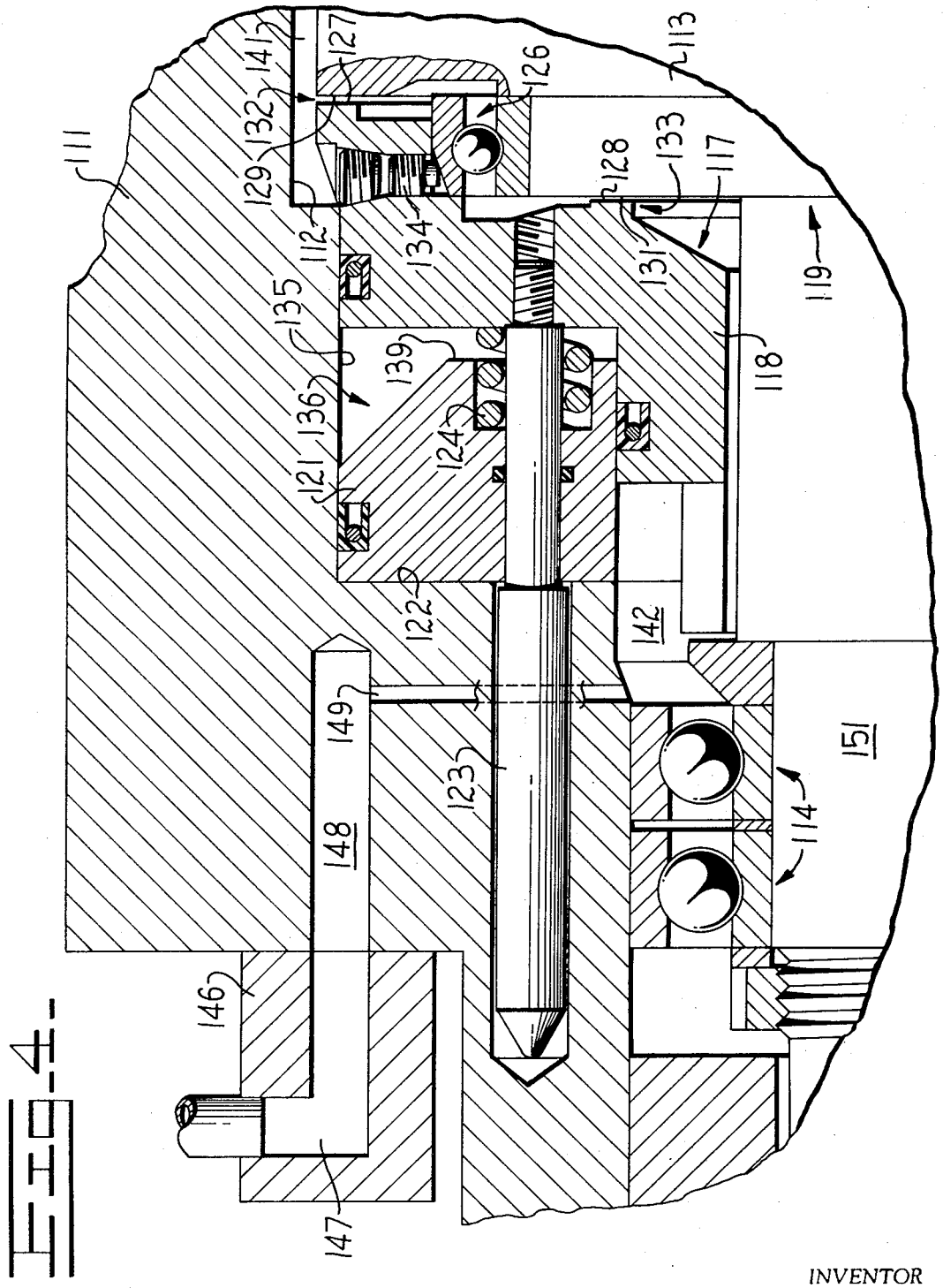

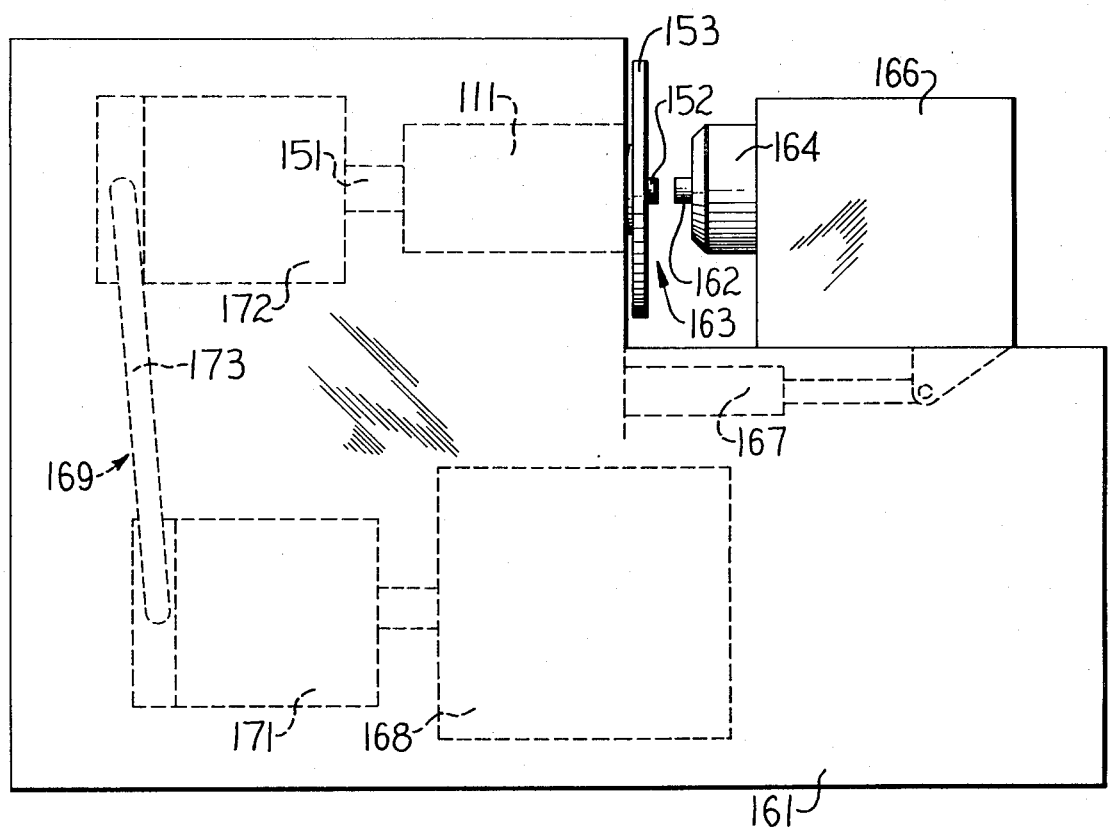

HYDROSTATIC BEARING SEAL ASSEMBLY

This is a Continuation-in-Part of application, Ser. No. 821,041, filed May 1, 1969 and now abandoned.

The present invention relates to a rotary type seal assembly suitable for use under high pressure and high speed conditions and more particularly to a hydrostatic bearing seal assembly employable, for example, within the spindle housing of a friction welding machine.

The seal assembly of the present invention is described below with reference to a friction welding machine. The seal assembly forms a leakage seal in association with a hydrostatic bearing which supports a spindle within a spindle housing during the application of thrust loads as in a welding cycle. The seal assembly of the present invention may also be employed as a leakage seal between other relatively rotatable members similar to the spindle and spindle housing of the friction welding machine described herein. The seal is then effective to maintain desired hydrostatic fluid pressure within the hydrostatic bearing region such as that formed by the spindle housing.

Numerous problems are encountered in the provision of a seal assembly suitable for operation in environments of the type described above. As is commonly required in a friction welding cycle, the spindle must be capable of rotation at very high speeds within the spindle housing. Further, large axial thrust loads must be transferred between the spindle and spindle housing such as when a pair of workpieces is brought into axial engagement during the welding cycle. Thus, the seal assembly must be capable of effective operation within a high speed, high pressure environment.

Another problem encountered within such environments arises from the interaction of relatively rotating portions of the seal assembly upon fluid which is substantially restrained by the seal. Interaction of such relatively rotating parts develops a retarding torque which tends to consume a portion of the rotational force driving the spindle and thereby reduces efficiency of the friction welding machine.

One example of a prior art seal assembly employed within such applications includes a pair of relatively rotating face seals wherein at least one of seal members is hydraulically balanced to establish spacing between the two seal members and thus control the amount of fluid leakage across the seal. In seal arrangements of this type, the hydraulic pressure of fluid passing between the seal faces is employed to position one of the seal members with respect to the other seal member and thus determine the spacing between their seal faces. Seal assemblies of this type must generally be constructed to very precise specifications and tend to be very expensive. Further, seal assemblies of this type will generally not tolerate any substantial radial movement between the two seal members without upsetting the critical hydraulic balance required for their operation.

Another problem encountered within seal assemblies of this type is the effect of dirt or other foreign material within the hydraulic fluid. Where the seal assembly operates upon the hydraulically balanced principle referred to above or where there is an extensive seal face surface area past which the fluid must flow, such foreign materials may become wedged between the relatively rotating seal faces or otherwise interfer with proper operation of the seal. Upon wedging of foreign material between the relatively rotating seal members, their faces may become scored or otherwise damaged, leading to failure of the seal assembly.

Accordingly, it is an object of the present invention to provide a rotary seal assembly employable within such operating environments while substantially eliminating or minimizing problems of the type described above. In accomplishing this object, the present seal assembly includes one seal member relatively fixed against axial movement, another relatively rotatable seal member capable of being axially urged toward the fixed member with mechanical bearing means employed to maintain desired spacing between the two seal members.

It is to be particularly noted in comparison with the prior art seal assemblies referred to above, that the present seal assembly depends upon unbalanced forces acting upon one of the seal members in conjunction with the mechanical bearing to maintain the desired spatial relation between the two seal members. Since the mechanical bearings establish spacing between the two seal members, the present seal assembly is much less susceptible to damage from relative radial motion or relative angular motion which commonly cause galling or seizure of such seal faces. Further, since the present seal assembly more positively establishes spacing between the two seal members, the effective sealing surface may be substantially reduced. This, in turn tends to minimize retarding torque effects of the type referred to above so that less rotational force is absorbed within the seal assembly during operation. Minimizing the surface area of the seal faces tends to reduce the possibility of damage from foreign particles passing through the seal. Still further, the rate of fluid leakage across the seal may be more closely controlled by the positively controlled spacing between the two seal members.

Other objects and advantages of the present invention are made apparent in the following description having reference to the accompanying drawings:

In the drawings:

FIG. 1 is an axially sectioned view of the present seal assembly arranged between the spindle and spindle housing of a friction welding machine;

FIG. 2 is an enlarged, fragmentary view of the seal assembly with parts similarly sectioned as in FIG. 1;

FIG. 3 is an axially sectioned view of another embodiment of the invention arranged between the spindle and spindle housing of a friction welding machine;

FIG. 4 is an enlarged, fragmentary view of the seal assembly of FIG. 3, and

FIG. 5 is a partially schematic side view of a friction welding machine in which the present seal assembly may be employed.

The construction and manner of operation of the present seal assembly is described with particular reference to the spindle and spindle housing of a friction welding machine as illustrated in FIG. 1, for example. However, it will be apparent from the following description that the seal assembly is also adaptable for use in many other applications, in particular to provide an effective fluid seal between other relatively rotating members besides the spindle and spindle housing shown in FIG. 1.

Referring now to FIG. 1, one embodiment of the present seal assembly is shown within an exemplary environment formed by a portion of a friction welding machine. A spindle 11 is rotatably mounted upon bearings 12 and 13 within a spindle housing, a portion of which is indicated at 14. A chucking assembly 16 is disposed at one end of the spindle 11 to secure a workpiece indicated at 17. As is common practice in the friction or inertia welding art, the workpiece 17 is maintained in axial alignment with another workpiece (not shown) supported by a suitable tailstock (not shown). In a welding machine of the type presently contemplated the other workpiece is secured both against rotation as well as axial movement.

To accomplish a welding cycle, the spindle 11 and workpiece 17 are driven in rotation by means of a gear 18 meshing with gear teeth 19 formed upon the spindle 11. The workpiece 17 is urged against the other workpiece by means of a thrust cylinder 21 which is effective to shift the spindle housing 14 and spindle 11 either rightwardly or leftwardly as viewed in FIG. 1. Thus, the workpiece 17 may be urged against the other workpiece and driven in rotation relative thereto to accomplish a friction or inertia weld in a generally conventional manner. Upon engagement of the two workpieces, very large axial forces must be transferred through the rotatable spindle 11. A hydrostatic bearing, with which the present seal assembly is associated, serves this purpose and is described immediately below.

The leftward end of the spindle housing 14 forms a cylindrical bore 22 into which the left end of the spindle 11 extends. A cylindrical member 23 closes the bore 22 and is secured to the housing 14. The member 23 is also secured to the piston 20 of the thrust cylinder 21 so that the spindle housing 14 is effectively coupled to the cylinder 21 for the transmission of thrust forces in a manner described in greater detail below. The hydrostatic bearing may be better observed by also having reference to FIG. 2.

The hydrostatic bearing assembly includes a hydrostatic pressure chamber, generally indicated at 24, which is formed between the member 23 and a reaction plate 26 which is secured to the spindle 11, for example, by cap screws, one of which is indicated at 27. Hydraulic fluid under pressure is introduced into the hydrostatic chamber 24 through a conduit 28 and a passage 29 formed in the spindle housing 14 and the cylindrical member 23. The conduit 28 also provides fluid to the head end of the thrust cylinder 21 so that the hydrostatic chamber 24 is pressurized at generally the same time that the workpiece 17 is moved into axial engagement with the other workpiece. When the chamber 24 is pressurized, opposing surfaces 31 and 32 on the cylindrical member 23 and reaction plate 26 respectively, form hydrostatic bearing surfaces which cooperate with fluid under pressure in the chamber 24 to transfer axial thrust forces between the spindle 11 and the member 23 which is secured to the piston 20 of the thrust cylinder 21.

In operation, the various components of the spindle assembly provide for both rotation and axial movement of the spindle 11, As may be seen in FIG. 1, the spindle 11, which carries the chucking assembly 16, is driven in rotation by the gear 18 and rotates relative to the housing 14 upon bearings 12 and 13. Thrust pressure for axially shifting the workpiece 17 is applied by hydraulic operation of the piston 20 in the cylinder 21. Since the piston is secured to the member 23 and the member 23 is in turn secured to the housing 14, axial movement of the piston 20 is accompanied by shifting of the housing 14 and all parts contained therein, including the relatively rotatable spindle 11.

The seal assembly of the present invention, generally indicated at 33, effectively closes the hydrostatic chamber 24 and provides for controlled leakage of hydrostatic fluid into another chamber 34 which is partially formed by the reaction plate 26, the spindle housing 14 and the spindle 11. Fluid from the chamber 34 is permitted to pass through the rear spindle bearing 12 and enter a drain passage 36 by means of an opening 37 formed in the spindle housing 14.

The seal assembly 33 includes a floating seal ring 41 arranged between the member 23 and the reaction plate 26. The seal ring 41 is secured against rotation to the member 23 by means of dowels, one of which is indicated at 42. The seal ring 41 is free to move axially relative to the member 23 while fluid passage between cylindrical surfaces formed respectively at 43 and 44 on the ring 41 and member 23 is prevented by means of a seal element 46. Controlled leakage of fluid from the hydrostatic chamber 24 into the drain chamber 34 is permitted between seal faces formed respectively at 47 and 48 on the seal rings 41 and the reaction plate 26.

To accurately control the leakage rate between the seal faces 47, 48 and to generally prevent undesirable contact between the seal faces, desired spacing between the seal faces 47 and 48 is controlled by mechanical antifriction bearing means such as a plurality of ball bearings circumferentially arranged between the seal ring 41 and the reaction plate 26, one of the ball bearings being indicated at 51. The ball bearings 51 are conventionally supported by retaining rings indicated at 52. the radial position of the bearings is further controlled by means of an annular slot 53 formed in the seal ring 41. The bearings 51 are arranged in generally close proximity to the seal faces 47, 48 to accurately maintain spacing therebetween even during relative radial motion of the seal ring 41 and reaction plate 26.

Because of the mechanical restraint provided by the bearings 51 which establishes minimum spacing between the seal faces 47, 48, it is desirable that the seal ring 41 be acted upon by unbalanced forces tending to shift the seal ring 41 toward the reaction plate 26 which is axially fixed upon the spindle 11. Unbalanced force on the seal ring 41 is preferably accomplished by means of hydrostatic pressure in the chamber 24. Hydrostatic pressure existing within the chamber 24 acts upon all surfaces of the seal ring 41 which are adjacent to the chamber 24. Since fluid pressure drops from hydrostatic pressure to zero during leakage between the seal faces 47, 48, the seal face 47 also experiences a radially differential force from the escaping fluid. The surfaces 54 and 56 respectively opposite and adjacent the reaction plate 26 are sized so that hydrostatic pressure in the chamber 24 produces a resultant force acting upon the seal ring 41 in a rightward direction as viewed in FIG. 2. Thus, the seal ring 41 tends to be urged toward the fixed reaction plate 26.

To preload the seal ring 41 and maintain engagement between the seal ring 41, the bearing 51, and the reaction plate 26, a plurality of springs, one of which is indicated at 57, are arranged for interaction between the seal ring 41 and the member 23. It is to be noted that with balanced hydraulic loading on the seal ring 41, the seal ring could be urged toward the reaction plate 26 by the springs 57 even during hydrostatic pressurization of the chamber 24.

When the chamber 24 is pressurized and the spindle 11 is rotating relative to the housing 14, retarding torque forces tend to be developed by fluid existing between the relatively rotating seal ring 41 and retainer reaction plate 26. These retarding forces are greatest where surfaces of the relatively rotating members are in close proximity. To minimize these retarding forces and thus increase operating efficiency of the spindle assembly, the seal face 47 is formed by an annular projection 61 of relatively small radial dimension. Thus, the total surface area of the closely spaced seal faces is made as small as possible. Since the retarding torque or oil shearing effect referred to above is predominantly developed between these close surfaces, the reduction in surface area between the effective seal faces substantially reduces the amount of rotational energy consumed within the seal assembly.

The seal ring 41 also has a stepped annular surface 62 adjacent the seal face 47. The stepped surface 62 is spaced somewhat further away from the surface 48 of the reaction plate 26 to diminish oil shearing effects at the inner periphery of the seal face 47. The seal ring 41 also has a substantial thickness adjacent the surface 62 to prevent development of undesirably high hoop stresses which might tend to flex the seal ring 41. Distortion of the seal ring 41 is accordingly reduced. Thus, critical spacing between the seal faces 47, 48 may be more accurately maintained and the radial dimension of the seal face 47 may be substantially reduced.

Another embodiment of the hydrostatic bearing seal assembly is illustrated in FIGS. 3 and 4 and may be employed in a friction welding machine of the type illustrated in FIG. 5. Portions of the friction welding machine are also illustrated in FIGS. 3 and 4 to provide a preferred embodiment for the seal assembly.

A spindle assembly, as may be best seen in fIG. 3, includes a spindle housing 111 having a stepped bore 112. A spindle 113 is supported for rotation within the bore 112 by two rear spindle bearings indicated at 114 and two forward spindle bearings indicated at 115. The spindle is axially positioned by a hydrostatic bearing seal assembly indicated generally at 117.

The seal assembly 117, which is shown in greater detail by FIG. 4, comprises a seal ring 118 arranged in axially movable relation within the bore 112 adjacent one end of the spindle 113, generally indicated at 119. A reaction plate 121 is arranged in abutting relation with a stepped surface 122 of the bore 112. A plurality of driving pins, one of which is indicated at 123, penetrate the seal ring 118, reaction plate 121 and housing 111 to prevent rotation of the seal ring and reaction plate. A spring 124 surrounds each pin 123 and interacts between the seal ring and reaction plate to urge them axially apart from each other.

An angular contact, anti-friction bearing assembly 126 is arranged between the seal ring 118 and the end 119 of the spindle. The seal ring 118 also has two annular, projecting seal faces 127 and 128 arranged radially outwardly and radially inwardly of the bearing assembly 126 respectively. The seal faces 127 and 128 cooperate respectively with seal surfaces 129 and 131 formed on the end 119 of the seal ring 118 to form two seal areas 132 and 133.

The springs 124 urge the seal ring rightwardly, as shown in FIGS. 3 and 4, against the bearing assembly 126. Desired spacing of the seal areas 132 and 133 is therefor established and maintained by the bearing assembly. A pin 134 threadedly penetrates the seal ring 118 and is tightened against the bearing assembly to further assure proper positioning of the bearing assembly.

A hydrostatic pressure chamber is formed, as indicated at 136, by the end 119 of the spindle, the seal ring 118, the reaction plate 121, and a stepped portion 135 of the bore 112 in the housing 111. Fluid introduced into the chamber 136 through an inlet passage 137 is permitted to circulate throughout the entire chamber 136 by means of an axial passage 138 formed in the seal ring.

During operation, a hydrostatic bearing for absorbing axial thrust loads imposed on the spindle 113 is established by fluid interaction in the chamber 136 between surface 139 of the reaction plate 121 and surfaces 129 and 131 on the spindle. Although the seal ring is situated between plate 121 and spindle 113, opposing surfaces of the seal ring are preferably balanced so that positioning of the seal ring is not affected by pressure in the chamber 136. With such a balanced arrangement, the seal ring is urged against the bearing assembly 126 and toward the spindle only by the springs 124. However, in order to assure firm engagement across the bearing assembly 126 under all operating conditions, it may be desirable to vary the opposed surface areas of the seal ring which are exposed to fluid pressure in the chamber 136 so that fluid pressure therein cooperates with the springs 124 in urging the seal ring against the bearing assembly 126 and toward the spindle 113.

Due to the extremely high pressure in the hydrostatic bearing chamber 136, and since the bearing is established between a non-rotating member 121 and a rotating member 113, it is difficult, if not impossible, to completely seal the hydrostatic bearing chamber against leakage. The problem overcome by the present invention, is therefor that of controlling leakage from the hydrostatic bearing chamber at an acceptable rate while preventing or substantially eliminating damaging contact between the seal ring and the spindle.

In the embodiment of FIGS. 3 and 4, two seal areas, 132 and 133, are provided for controlling fluid leakage. The anti-friction bearing assembly 126 establishes the exact clearance between the seal faces 127, 128 on the non-rotating seal ring and surfaces 129, 131 on the rotatable spindle while the seal ring is urged toward the spindle by the springs 124 and/or hydraulic pressure in the chamber 136 to maintain the desired clearance.

Since the hydrostatic bearing chamber 136 is located between the two seal areas 132 and 133, two distinct leakage paths are provided. One leakage path is across seal area 132 radially outwardly into a low pressure chamber 141 and the other leakage path is across seal area 133 radially inwardly into low pressure chamber 142. Fluid in low pressure chambers 141 and 142 returns to the fluid reservoir by passages 143 and 144, respectively. Since the tolerance across the seal areas 132 and 133 are quite close, a relatively small amount of fluid is leaked across the seals.

A manifold block 146 is secured to the rear of the housing 111 and contains an inlet passage 147 connecting with a passage 148 in the housing. Fluid entering through these passages is communicated by internal passages 149 in the housing to the rear bearings 114 for lubrication.

A drive shaft 151 is secured to the end 119 of the spindle 113 for connecting it with a suitable drive mechanism described below with reference to FIG. 5. The spindle 113 also contains internal chucking means (not shown) for securing a workpiece 152. One or more flywheels 153 may also be attached to the spindle 113 to provide welding energy in a well-known manner for inertia welding.

The chuck assembly of FIGS. 3 and 4 may be employed in a friction welding machine of the type shown in FIG. 5. The machine shown in FIG. 5 includes a frame generally indicated at 161 for housing the various elements of the machine. Two parts such as the workpiece 152 and another workpiece 162 are mounted for bonding within a chuck assembly 163 corresponding to that shown in FIGS. 3 and 4 and a tailstock chuck 164.

The chuck 164 is secured against rotation upon a tailstock fixture 166. The fixture 166 is mounted for axial movement upon the machine frame 161 under the control of a load cylinder 167. A pressure control circuit, not shown, regulates the pressure in the load cylinder and thus determines the force with which the parts 152 and 162 are engaged.

The welding thrust force applied by the load cylinder 167, through the tailstock fixture 166, is resisted or absorbed by the hydrostatic bearing previously described.

A motor 168 rotates the spindle 163 (also indicated at 113 in FIG. 3) through a hydrostatic transmission generally indicated by the reference numeral 169. The hydrostatic transmission includes a hydraulic pump 171, a hydraulic motor 172 and a manifold 173 between the pump and motor. The motor 172 is coupled to the drive shaft 151.

The friction welding machine illustrated in FIG. 5 is generally operated in a conventional welding cycle typical for machines of this type.

It is noted that the spindle housing 111 of FIGS. 3 and 5 is axially stationary, whereas the spindle assembly shown in FIG. 1 is axially movable. Axial thrust forces for use during a weld cycle are provided by the tailstock portion of the machine in FIG. 5.

Critical spacing between the seal faces, for purposes of the present invention and as discussed above, refers to maintenance of the seal faces in positively spaced apart relation in order to prevent galling or seizure, for example, of the relatively rotating seal faces. The spacing between the seal faces is otherwise determined only for the purpose of minimizing or regulating the rate of fluid flow between the seal faces.

Accordingly, a specific dimension for the spacing between the seal faces in either embodiment is not of significant importance to the present invention. However, for purposes of possibly providing a clearer understanding of the invention, exemplary dimension and operating characteristics are set forth below for the seal assembly and hydrostatic bearings as illustrated in FIGS. 3 and 4. The exemplary values set forth below are typical for a given machine size, a specific type of hydrostatic fluid operating at a given temperature and a specific operating pressure. Should one or more of these parameters be varied, the exemplary values would not necessarily remain the same.

The following values are also indicative of design criteria for the embodiment of FIGS. 1 and 2.

Referring now to FIGS. 3 and 4, typical specifications for a hydrostatic bearing seal assembly, employable, for example, in a friction welding machine of the type illustrated in FIG. 5, are:

| | |
|---|---|
| Pressure developed within the hydrostatic bearing chamber (136) | 3500 psi |
| Dimensions of internal seal area (133) | |
| Outside diameter of seal face (128) | 5.4029 in. |
| Inside diameter of seal face (128) | 4.8029 in. |
| Dimensions of external seal area (132) | |
| Outside diameter of seal face (127) | 9.7765 in. |
| Inside diameter of seal face (127) | 9.1765 in. |
| Spacing between seal faces 127, 128 and spindle surfaces 129 and 131 respectively | 0.0015 in. |
| Total flow rate across both seal areas when hydrostatic bearing is pressurized (approximate) | 13 gal/min. |

It is particularly noted that the flow rate for a similar hydrostatic bearing seal assembly employing generally conventional capillary type seals was approximately 50 gallons per minute.

What is claimed is:

1. A hydrostatic bearing rotary seal assembly suitable for use in a high pressure and high speed operation environment, comprising:
   a. a rotatable shaft,
   b. a hollow housing surrounding at least a part of said shaft,
   c. a rotatable member fixedly attached to said shaft relatively fixed against axial movement and having an annular seal face,
   d. a floating seal ring adjacent said rotatable member including a facing having a projection forming a second annular seal face adjacent the seal face of said rotatable member, said seal ring, rotatable member and housing defining a first fluid chamber radially outwardly of said seal faces and a second fluid chamber radially inwardly of said seal faces, communication between said chambers being between said seal faces,
   e. fluid introducing means communicating fluid under pressure into one of said chambers,
   f. fluid draining means in the other of said chambers communicating fluid away from said other chamber,
   g. means axially urging said seal ring toward said rotatable member, and
   h. mechanical hydrostatic ball bearing means between said seal ring and said rotatable member, the size of said bearing and the size of the projection of said second annular seal face cooperating to define the gap between said annular seal face and said rotatable annular seal face, and to control fluid flow between said chambers, said seal ring having axially opposite faces, said faces sized and cooperating with said pressurized fluid to provide hydraulic force in the direction of said rotating member and maintaining said bearing in contact with both said seal ring and said rotatable member.

2. The invention of claim 1 wherein the chamber receiving fluid under pressure is a hydrostatic chamber and the housing and fixed member form hydrostatic bearing surfaces adjacent the chamber on opposite sides of the seal ring.

3. The invention of claim 1 wherein a stepped annular surface is formed on the seal ring adjacent the annular projection, the stepped surface being generally recessed relative to the seal face formed by the projection and arranged radially on a relatively high pressure side of the adjacent seal faces.

4. The invention of claim 1 wherein one of the seal faces is formed by an annular projection with an adjacent stepped surface being radially arranged on a relatively high pressure side of the adjacent seal faces.

5. The invention of claim 1 wherein the adjacent seal faces are arranged radially outwardly of the chamber into which fluid is introduced and radially inwardly of the chamber from which fluid is drained, the rotatable member and the seal ring forming another pair of adjacent seal faces radially inwardly of the chamber into which fluid is introduced, the bearing assembly maintaining minimum axial spacing between both pairs of adjacent seal faces; an additional drain chamber being formed radially inwardly of the other pair of adjacent seal faces.

6. The invention of claim 1 further comprising spring means acting upon the seal ring and establishing a preload to urge the seal ring toward the fixed member.

7. The invention of claim 1 wherein the seal face on the seal ring is annularly formed by a projection on the seal ring adjacent the circumferentially spaced bearings, the bearings establishing minimum spacing between the annular seal face and fixed member.

8. The invention of claim 1 wherein the seal ring and housing are secured together, the rotatable member being rotatable relative thereto, the seal ring being axially movable relative to the housing with seal means arranged therebetween.

9. The seal assembly of claim 1 arranged in combination between a rotatable spindle and spindle housing of a friction welding machine.

10. The invention of claim 9 wherein the rotatable is secured to the spindle and the hollow housing is at least partially formed by the spindle housing, the seal ring being secured against rotation to the hollow housing and being axially movable relative to the hollow housing, seal means being arranged between the seal ring and hollow housing with spring means effectively interacting between the seal ring and hollow housing to establish a preload for urging the seal ring toward the fixed member.

* * * * *